(12) United States Patent
Garrison et al.

(10) Patent No.: US 7,398,910 B2
(45) Date of Patent: Jul. 15, 2008

(54) SYSTEM FOR USE IN TAPPING A PIPE

(75) Inventors: Tony R. Garrison, Bixby, OK (US); Larry J. Oden, Collinsville, OK (US); James E. Terry, Tulsa, OK (US); Dixit B. Kadakia, Tulsa, OK (US)

(73) Assignee: TDW Delaware, Inc., Wilmington, DE (US)

(*) Notice: Subject to any disclaimer, the term of this patent is extended or adjusted under 35 U.S.C. 154(b) by 0 days.

(21) Appl. No.: 11/724,018

(22) Filed: Mar. 14, 2007

(65) Prior Publication Data

US 2007/0158393 A1    Jul. 12, 2007

Related U.S. Application Data

(62) Division of application No. 10/909,986, filed on Aug. 3, 2004, now Pat. No. 7,216,795.

(51) Int. Cl.
*B23K 37/04* (2006.01)

(52) U.S. Cl. ............... 228/47.1; 228/212; 228/44.3; 29/890.141

(58) Field of Classification Search ............ 29/890.14, 29/525.14, 890.129, 890.141, 890.11; 228/101, 228/212, 44.3, 44.5, 47.1; 285/15

See application file for complete search history.

(56) References Cited

U.S. PATENT DOCUMENTS

| | | | |
|---|---|---|---|
| 2,775,469 A | 12/1956 | Brown et al. | |
| 3,401,957 A | 9/1968 | McCright et al. | |
| 3,433,507 A * | 3/1969 | Ver Nooy | ............... 285/197 |
| 3,599,663 A | 8/1971 | Ver Nooy | |
| 3,626,475 A | 12/1971 | Hicks | |
| 3,665,966 A | 5/1972 | Ver Nooy | |
| 3,703,906 A | 11/1972 | Tickett | |
| 3,872,880 A | 3/1975 | Ver Nooy | |
| 4,111,234 A | 9/1978 | Wells et al. | |
| 4,411,459 A | 10/1983 | Ver Nooy | |
| 4,653,782 A | 3/1987 | Munday | |
| 4,768,813 A | 9/1988 | Timmons | |
| 5,040,828 A | 8/1991 | Kane | |
| 5,118,139 A | 6/1992 | Lott | |
| 5,241,981 A | 9/1993 | Ahern | |
| 5,360,300 A | 11/1994 | Sullivan | |

(Continued)

OTHER PUBLICATIONS

Intl Search Report, Feb. 17, 2006, WIPO.

*Primary Examiner*—Kevin P Kerns
*Assistant Examiner*—Michael Aboagye
(74) *Attorney, Agent, or Firm*—Gable Gotwals

(57) ABSTRACT

A mechanical weldable fitting for use in tapping a pipe includes a first and second metal collar, each formed of attachable upper and lower semi-toroidal portions that when assembled on the pipe providing spaced-apart external cylindrical surfaces. Each collar having at least one internal circumferential sealing groove therein that receives a gasket formed about the pipe. A lower semi-tubular metal containment member is positioned on the external cylindrical surfaces of the collars. An upper semi-tubular metal containment member is positioned on the external cylindrical surfaces of the collars. The upper containment member having an integral upwardly extending tubular access portion affording passage for tapping the pipe. The upper and lower containment members are welded to each other and to the collars to fully encompass a portion of the pipe.

4 Claims, 3 Drawing Sheets

U.S. PATENT DOCUMENTS

| | | |
|---|---|---|
| 5,374,087 A | 12/1994 | Powers |
| 5,443,095 A | 8/1995 | Glossop, Jr. |
| 5,451,128 A | 9/1995 | Hattersley |
| 5,466,099 A | 11/1995 | Sullivan et al. |
| 5,531,250 A | 7/1996 | Freeman et al. |
| 5,553,898 A | 9/1996 | Rogers, Jr. |
| 5,605,357 A | 2/1997 | Bird |
| 5,772,253 A | 6/1998 | Hodge et al. |
| 5,806,896 A | 9/1998 | Sato et al. |
| 5,967,168 A | 10/1999 | Kitani et al. |
| 6,019,398 A | 2/2000 | Powers |
| 6,131,957 A | 10/2000 | Saito et al. |
| 6,305,719 B1 * | 10/2001 | Smith et al. .......... 285/15 |
| 6,648,377 B2 | 11/2003 | Marandi |
| 6,758,237 B2 | 7/2004 | Sichler et al. |

* cited by examiner

SYSTEM FOR USE IN TAPPING A PIPE

REFERENCE TO PENDING APPLICATIONS

This application is a divisional of U.S. patent application Ser. No. 10/909,986, filed on Aug. 3, 2004 now U.S. Pat. No. 7,216,795 entitled "A Mechanical Weldable Fitting For Use In Tapping A Pipeline".

REFERENCE TO MICROFICHE APPENDIX

This application is not referenced in any microfiche appendix.

BACKGROUND OF THE INVENTION

This invention relates to systems and methods for affixing a fitting to the exterior surface of a pipeline in a manner that can be accomplished while fluid is flowing under pressure within the pipeline. The invention is particularly useful for applying a fitting to a pipeline to permit the pipeline to be tapped so that the pipeline can be plugged or for the purpose of providing a branch fitting. "Pipe" as used herein is inclusive of any tubular member made of metal for carrying fluid (liquid or gas) and specifically is inclusive of "pipeline." Machines for tapping an opening in a pipe are well-known. Prior issued United States patents for tapping machines include U.S. Pat. No. 3,614,252 entitled TAPPING APPARATUS; U.S. Pat. No. 4,579,484 entitled UNDERWATER TAPPING MACHINE; U.S. Pat. No. 4,880,028 entitled COMPLETION MACHINES; U.S. Pat. No. 5,439,331 entitled HIGH PRESSURE TAPPING APPARATUS; U.S. Pat. No. 5,612,455 entitled METHOD OF INSERTING A SENSOR INTO A PIPELINE; and U.S. Pat. No. 6,012,878 entitled PRESSURE BALANCE SUBSET TAPPING MACHINE. Tapping machines of the kind described in the above-mentioned U.S. patents are for tapping a hole in a pipe or a pipeline while liquids or gases are flowing through it—that is, while the pipe is under pressure. Tapping procedures of this type are customarily carried out for one of two purposes—that is, to provide a branch fitting or to enable fluid flow through the pipe to be blocked. Other examples of prior art that describe and illustrate plugging the interior of a pipe usually associated with first tapping the pipe, include the following United States patents:

| PATENT NO. | INVENTOR | TITLE |
| --- | --- | --- |
| 3,599,663 | Freeman | Hot Tapping Apparatus |
| 3,626,475 | Hicks | High Temperature Pipe-Plugging Apparatus |
| 3,665,966 | Ver Nooy | Pipe Plugger |
| 3,872,880 | Ver Nooy et al. | Plugging Apparatus |

| PATENT NO. | INVENTOR | TITLE |
| --- | --- | --- |
| 4,411,459 | Ver Nooy | Branch Fitting for Providing Access to the Interior of a Pipe |
| 5,443,095 | Glossop, Jr. | Fluid Blocking Device |
| 5,531,250 | Freeman et al. | Device for Plugging the Interior of a Pipe |

Tapping a pipe normally involves the use of a circular saw, examples of which are illustrated and described in the following United States patents:

| PATENT NO. | INVENTOR | TITLE |
| --- | --- | --- |
| 5,360,300 | Sullivan | Cutter Shell |
| 5,451,128 | Hattersley | Cutter Tool Having Removable Teeth |
| 5,466,099 | Sullivan et al. | Cutter Shell for Forming Holes of Improved Cylindricality |

Devices for plugging a pipe that has been tapped are also well known as illustrated by U.S. Pat. No. 5,531,250 entitled DEVICE FOR PLUGGING THE INTERIOR OF A PIPE.

Patents that teach fittings attachable to the exterior of a pipeline include the following:

| PATENT NO. | DATE ISSUED | INVENTOR |
| --- | --- | --- |
| 2,775,469 | Dec. 25, 1956 | Brown, et al. |
| 3,433,507 | Mar. 18, 1969 | Ver Nooy |
| 4,768,813 | Sep. 6, 1988 | Timmons |
| 5,040,828 | Aug. 20, 1991 | Kane |
| 5,374,087 | Dec. 20, 1994 | Powers |
| 5,553,898 | Sep. 10, 1996 | Rogers, Jr. |
| 5,806,896 | Sep. 15, 1998 | Sato, et al. |
| 5,967,168 | Oct. 19, 1999 | Kitani, et al. |
| 6,019,398 | Feb. 1, 2000 | Powers |
| 6,131,957 | Oct. 17, 2000 | Kikuo Saito, et al. |
| 6,648,377 | Nov. 18, 2003 | Marandi |

These patents are incorporated herein by reference since they provide a thorough background relating to the subject matter of the present invention.

BRIEF SUMMARY OF THE INVENTION

The invention herein provides a system for use in tapping a pipe carrying fluid under pressure. The system includes first and second metal collars, each formed of attachable upper and lower semi-toroidal portions that, when assembled on the pipe and attached to each other provide internal cylindrical surfaces conforming to the pipe external cylindrical surface. Each collar has at least one internal circumferential sealing groove therein. The collars when assembled on a pipe provide spaced-apart external cylindrical surfaces.

Gaskets are formed about the pipe external cylindrical surface. The gaskets are properly positioned on the pipe external surface to be received within the internal circumferential sealing groove in each collar semi-cylindrical portion. In a preferred arrangement, each collar has two spaced-apart and paralleled internal circumferential sealing grooves and therefore parallel and spaced-apart gaskets will be formed about the pipe external surface to be received in the parallel and spaced-apart grooves of each collar semi-toroidal portion.

After the toroidal semi-cylindrical portions of each of the pair of collars is assembled on the exterior pipe encompassing the gaskets thereon, a lower semi-tubular metal containment member is affixed to the spaced-apart collars. The semi-tubular metal containment member is of internal cylindrical diameter conforming to the external cylindrical surfaces of the spaced-apart collars and provides spaced-apart horizontal edges.

An upper semi-tubular metal containment member of internal cylindrical diameter conforming to the external cylindrical surfaces of the collars, and having parallel horizontal edges that match the horizontal edges of the lower containment member is assembled on the collars. The upper containment member has an integrally upwardly extending tubular access portion providing a passageway for tapping the pipe. The upper and lower containment members are welded to each other and to the collars to fully encompass a portion of the pipe spaced between the collars while providing access for tapping the pipe. The system can be assembled in leak-proof fashion on the exterior of a pipe without necessity of welding to the pipe.

The upper semi-tubular metal containment member preferably has a flange in a horizontal plane affixed to an upper end of the tubular access portion. Such flange is particularly useful for supporting tapping apparatus. Further, the system can include spacers affixed to the internal surfaces of the upper and lower containment members of thickness substantially equal to the thickness of the collars. Such spacers serve to support the containment members in proper position relative to the exterior surface of the pipe when placed in position to be welded to each other.

The invention encompasses a method of preparing a pipe that carries fluid (liquid or gases) to receive equipment by which the pipe may be tapped. The steps of the method include:

(a) Positioning on the external cylindrical surface of the pipe spaced-apart circumferential gaskets, each in planes perpendicular to the pipe axis.

(b) Assembling on the pipe first and second metal collars each formed of attachable upper and lower semi-toroidal portions that, when engaged with each other, provide internal cylindrical surfaces conforming to the pipe external cylindrical surface. Each collar has at least one internal circumferential sealing groove therein, each groove receiving a gasket having been placed on the pipe exterior surface in step (a).

(c) Securing the semi-toroidal portions of the first and second collars to each other to thereby capture gaskets in contact with the pipe's cylindrical surface. The assembled collars provide spaced-apart external cylindrical surfaces.

(d) Positioning an upper semi-tubular metal containment member onto the external cylindrical surfaces of the collars. The upper containment member has spaced-apart parallel lower horizontal edges and an integral upward extending tubular access portion.

(e) Positioning a lower semi-tubular metal containment member onto the external surface of the collars. The lower containment member having spaced-apart parallel upper horizontal edges that match the upper containment member lower horizontal edges.

(f) Welding the upper and lower containment members to the collars and to each other to fully encompass a portion of the pipe to provide passage through the tubular access portion for tapping the pipe.

The system providing facilities by which a pipe can be tapped without the necessity of welding to the pipe. This permits tapping a pipe even though the pipe may be carrying potentially explosive materials. After the system is attached and conditions change such that the pipe is no longer potentially explosive if it is raised to a welding temperature then the collars can be welded to the pipe. After welding of the collars to the pipe the entire assembly then forms an integrally welded metal enclosure and after welding the integrity of the seals provided by the gaskets is no longer required.

A better understanding of the invention can be had by reference to the following detailed description of the preferred embodiment and claims taken in conjunction with the attached drawing.

DETAILED DESCRIPTION OF THE PREFERRED EMBODIMENTS

Figure 1:
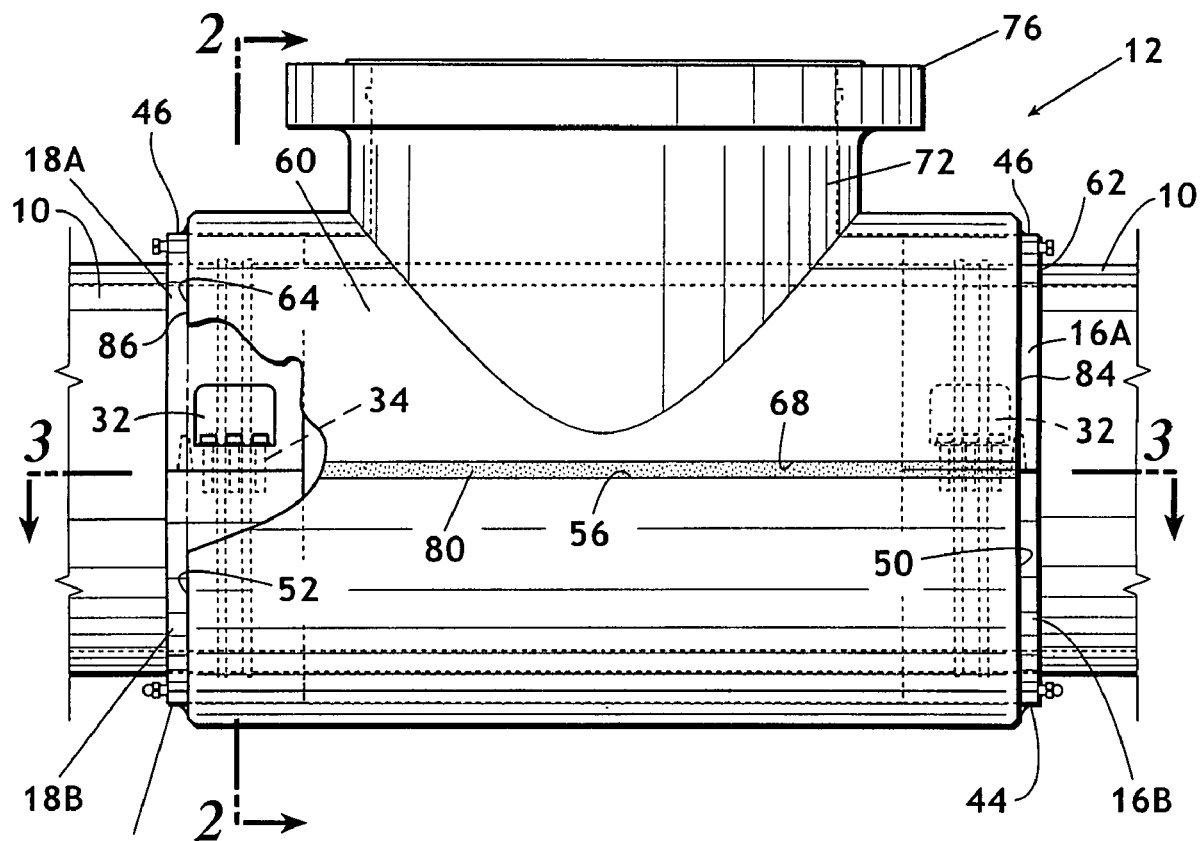
FIG. 1 is an elevational external view of the weldable fitting of this invention secured to the external surface of a pipe.
Figure 4:
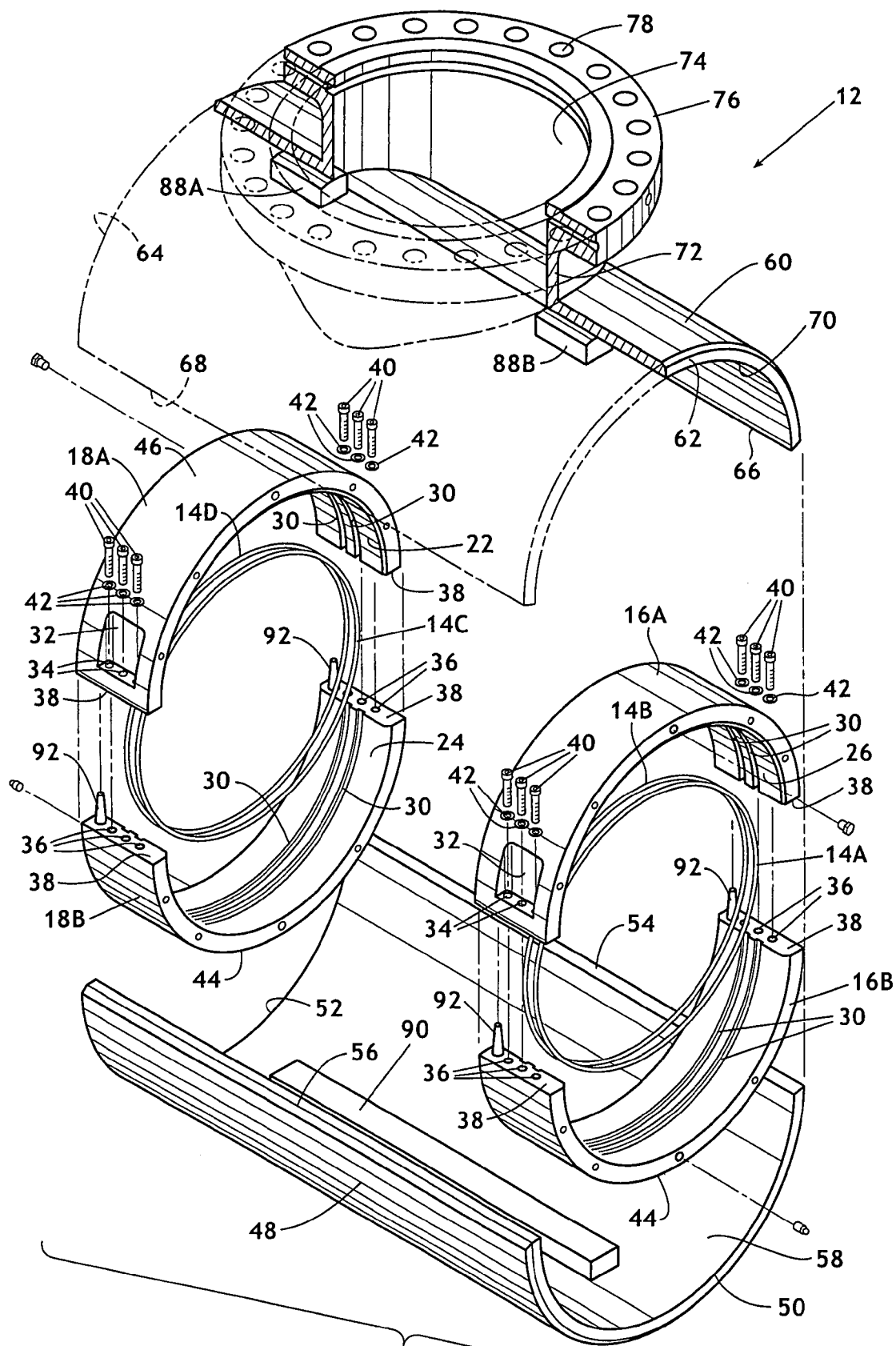
FIG. 4 is an exploded view of the components making up the mechanical weldable fitting for use in tapping a pipe. A portion of the upper semi-tubular metal containment member is shown in dotted outline so as to reveal more details of this member.

Components making up an illustrated exemplification of the invention are identified in the drawings by numerals as follows:

10 Pipeline
12 weldable fitting
14A-D gaskets
16A upper semi-toroidal first collar portion
16B lower semi-toroidal first collar portion
18A upper semi-toroidal second collar portion
18B lower semi-toroidal second collar portion
20 external surface
22 internal surface of 18A
24 internal surface of 18B
26 internal surface of 16A
28 internal surface of 16B seam
30 sealing groove
32 recesses in upper collar portions 88 upper spacer
34 bolt holes
36 threaded holes
38 end surfaces
40 bolts
42 washers
44 external cylindrical surface
46 external cylindrical surface
48 lower containment member
50 first end of 48
52 second end of 48
54 first horizontal edge
56 second horizontal edge
58 internal semi-cylindrical surface
60 upper containment member
62 first end of 60
64 second end of 60
66 first horizontal edge
68 second horizontal edge
70 internal semi-cylindrical surface
72 tubular access portion
74 passageway
76 flange
78 bolt holes
80 first horizontal welding seam
82 second horizontal welding seam
84 first circumferential welding seam
86 second circumferential welding seam
88 upper spacer 90 lower spacer
92 alignment pens
94 zerts
96 ports
98 area between sealing grooves 30
100 passageways
102 internal ports
104 outlet ports
106 plugs FIG. 1 is an elevational view showing a pipe 10 and showing a mechanical weldable fitting 12 secured to the pipe exterior surface. The mechanical weldable fitting 12 is the subject of this invention. FIG. 4 is an exploded view showing the components making up the weldable fitting 12. The components will be described in the sequence in which they are positioned on the exterior surface of a pipe in preparation for tapping the pipe.

Four circumferential gaskets 14A-14D are illustrated. Gaskets 14A-14D are installed on that is, placed around the external circumferential surface of a pipe 10 (no pipe is shown in FIG. 4). In the illustrated arrangement, gaskets 14 are employed in pairs—that is, gaskets 14A and 14B form one pair and spaced from them is a second pair 14C and 14D. The gaskets 14A-14D function in the nature of o-rings except that o-rings are typically uninterrupted toroidal elastomeric members. In this case the gaskets are not uninterrupted since they must be placed on the exterior surface of the pipe and in the case of a long pipe or pipeline cannot be slid over the pipe. For this reason, gaskets 14A-14D are formed of pieces of cord-like material that are each cut of a length to properly fit the circumference of pipe 10. Gaskets 14A and 14D are placed on the external circumference of a pipe 10 after the pipe has been thoroughly cleaned. Bonding material can be used in splicing the ends of the gaskets to each other.

Figure 2:
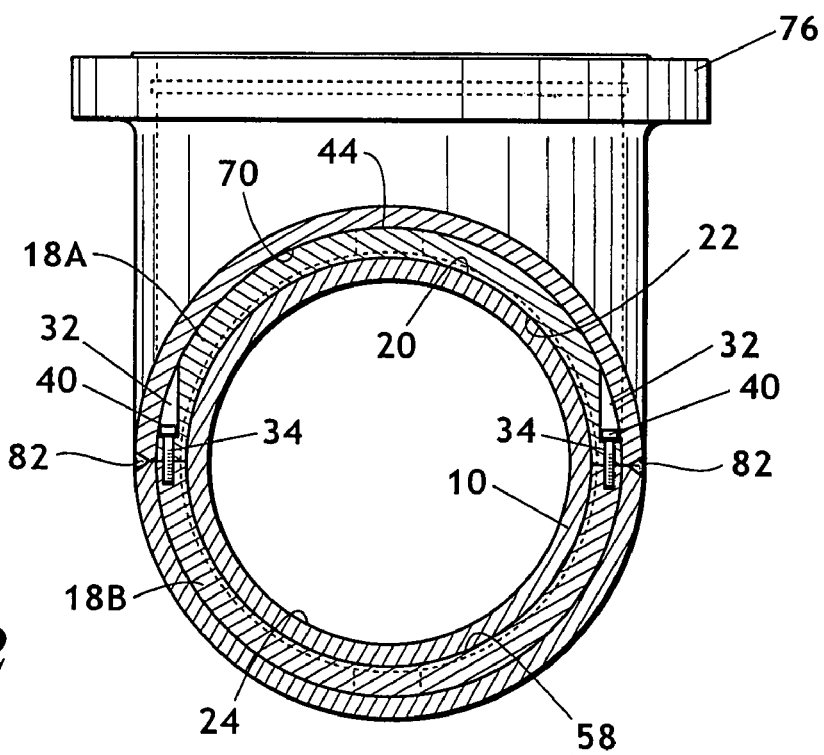
FIG. 2 is an elevational cross-sectional view taken along the line 2-2 of FIG. 1 showing the pipe in cross-section and showing portions of the weldable fitting also in cross-section.

After the gaskets 14A-14D are placed in position on the pipe, which can be accomplished utilizing guides (not shown) to ensure accurate spacings between each pair of gaskets and spacings between the pairs, the next step is the application of metal collars. A first metal collar is formed by an upper semi-toroidal collar portion 16A and a lower semi-toroidal collar portion 16B. In like manner, a second collar is made up of an upper semi-toroidal collar portion 18A and a lower semi-toroidal collar portion 18B. Toroidal collar portions when assembled together each provide an internal cylindrical surface that conforms to the external cylindrical surface of pipe 10. This is illustrated in FIG. 2 which discloses the external cylindrical surface 20 of pipe 10. The internal semi-cylindrical surface 22 of second collar upper semi-toroidal portion 18A and the internal semi-cylindrical surface 24 of second collar lower semi-toroidal portion 18B conform to the pipe external cylindrical surface 20.

Each of these internal surfaces 22, 24, 26 and 28 has a pair of parallel spaced-apart sealing grooves 30 therein. When the upper and lower portions of each collar are fitted together around pipe 10 grooves 30 encompass gaskets 14. Specifically, the upper and lower portions 16A and 16B of first collar have grooves 30 that encompass gaskets 14A and 14B and in like manner, the grooves 30 in upper and lower second collar portions 18A and 18B encompass gaskets 14C and 14D. Each of the upper collar portions 16A and 18A have at opposed ends thereof external recesses 32 that provide for the drilling of bolt holes 34. In illustrated arrangement, there are three bolt holes extending from each of collar recesses 32. Each of the lower collar portions 16B and 18B have, at opposed ends thereof, threaded holes 36 (three being shown) corresponding to the number of bolt holes 34 formed in upper collar portion 16A and 18A. Each of the collar semi-toroidal portions 16A, 16B, 18A and 18B terminate in planar horizontal end surfaces 38 that receive bolt holes 34 and threaded holes 36. After the semi-toroidal portions are joined about the exterior surface of pipe 10, encapsulating gaskets 14A-14D, bolts 40 (each with a washer 42) are inserted through holes 34 in the upper semi-toroidal collar portions of 16A and 18A and threaded into the threaded openings 36 in collar lower portions 16B and 18B, holding the collar portions together around the pipe 10. By the provision of recesses 32 the heads of bolts 40 are within the external cylindrical surface 44 formed by semi-toroidal upper and lower collar portions 16A and 16B and in like manner external cylindrical surface 46 formed by semi-toroidal collar portion 18A and 18B.

After collars 16A and 16B and 18A and 18B are formed sealably on the exterior surface of a pipe 10 two major components are secured to external cylindrical surfaces 44 and 46 to complete a mechanical weldable fitting. Positioned on the lower semi-toroidal collar portion 16B and 18B is a lower semi-tubular metal containment member 48. Member 48 is essentially semi-tubular—that is, it is formed of a tubular member such as a length of pipe divided in a plane of the tubular axis. This provides a trough-shaped member as best seen in FIG. 4, having a semi-circular ends 50 and 52 and co-planar horizontal edges 54 and 56. The internal semi-cylindrical surface 58 of lower containment member 48 conforms to the external cylindrical surfaces 44 and 46 formed by the collar members.

The second major element to complete the mechanical weldable fitting is an upper semi-tubular metal containment member 60, the basic portion of which is shaped like lower containment member 48—that is, the upper containment member 60 is semi-tubular and has opposed parallel ends 62 and 64 and co-planar first and second horizontal edges 66 and 68. Upper containment member 60 has an internal semi-cylindrical surface 70 of the same internal diameter as that of the lower containment member 48, the semi-cylindrical surface 70 conforming to the external cylindrical surfaces 44 and 46 of the collars.

Upper containment member 60 has an integrally formed upwardly extending tubular access portion 72 that provides a passageway 74 that communicates with the internal semi-cylindrical surface 70 of upper containment member 60. At the upper end of tubular access portion 72 is a horizontal circumferential flange 76 of the type commonly employed in piping. Flange 76 has bolt hole 78 therein by which apparatus, such as a tapping machine, may be secured to the fitting.

The method of practicing the invention herein by which a pipe or pipeline 10 that carries liquid or gas therethrough can receive equipment by which it can be tapped includes the first step of positioning on the external cylindrical surface 10 of the pipe spaced-apart circumferential gaskets 14A-14D. Semi-toroidal members 16A, 16B, 18A and 18B are then assembled on the exterior surface of pipe 10 encompassing the gaskets. The upper and lower semi-toroidal portions that form the pair of collars are held together by means of bolts 40.

Figure 3:
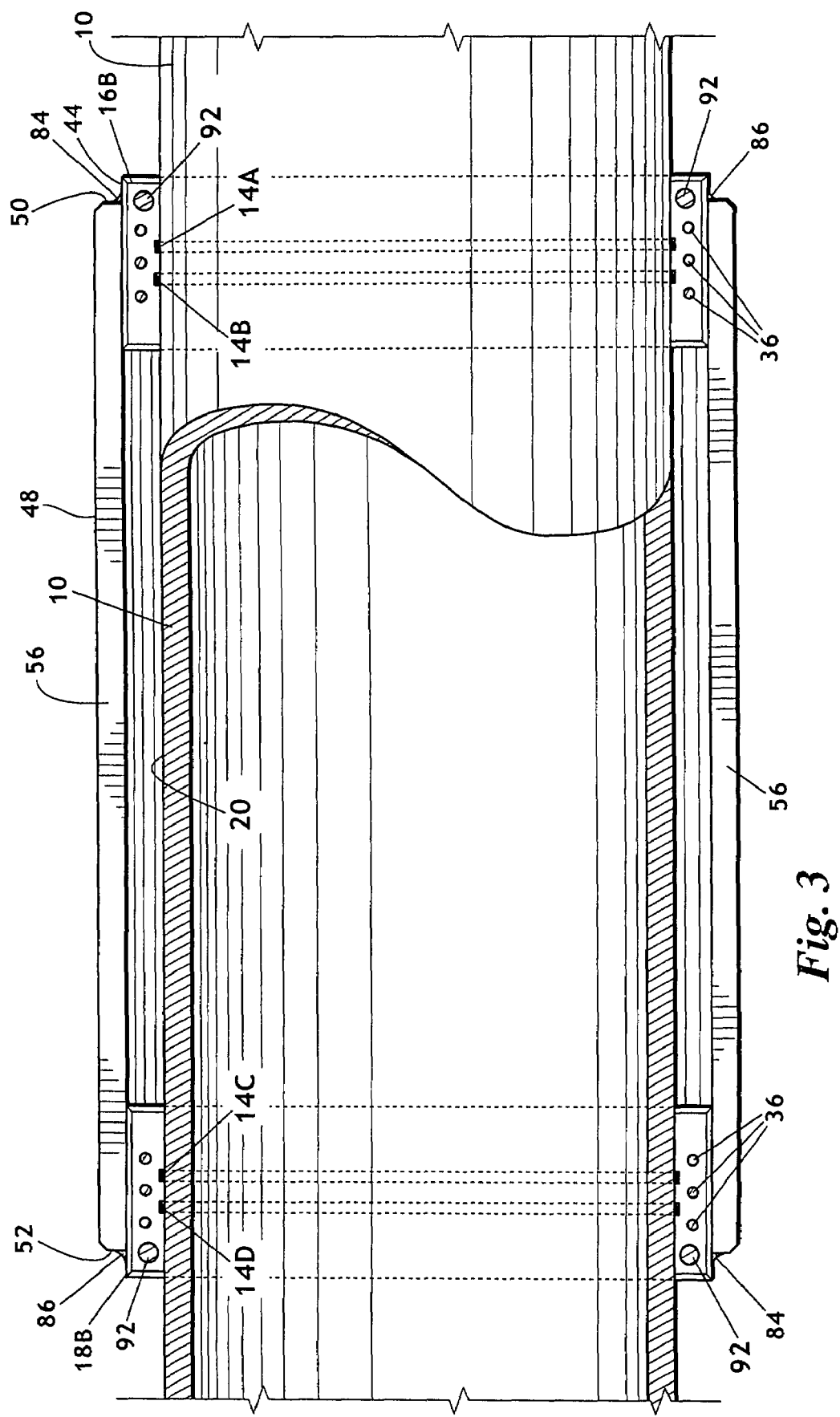
FIG. 3 is a horizontal cross-sectional view taken along the line 3-3 of FIG. 1 showing the pipe partially broken away and showing the lower halves of spaced-apart semi-toroidal portions forming collars secured to the external surface of the pipe and showing a lower semi-tubular metal containment member affixed to the collars.

After the collars are installed on the exterior surface of pipe 10, a lower semi-tubular containment member 48 is positioned on the external cylindrical surfaces 44 of the collars. Next, the upper containment member 60 is positioned on the collars so that the horizontal edges 66 and 68 of upper containment member 60 are juxtaposed to the horizontal edges 54 and 56 of lower containment member 48. These edges are then welded to each other forming opposed horizontal welding seams 80 and 82 (see FIGS. 1 and 2). First welding seam 80 is seen in both FIGS. 1 and 2 while the other horizontal welding seam 82 is seen only in the cross-sectional view of FIG. 2. Thereafter, the opposed ends 50 and 52 of lower containment member 48 and opposed ends 62 and 64 of upper containment member 60 are welded to the collars—that is, specifically to the upper semi-toroidal collar portion 16A and 18A and to a lower semi-cylindrical toroidal portions 16B and 18B. These circumferential welding seams 84 and 86 are seen in FIGS. 1 and 3. After welding seams 80, 82, 84 and 86 are complete, the fitting is completely assembled and secured about pipe 10. Thereafter, a tapping tool (not seen) may be affixed to flange 76 so that an opening may be tapped through the wall of pipeline 10, the completed opening communicating with passageway 74 formed by a tubular access portion 72 of upper containment member 60.

It can thus be seen that a complete fitting in the form of a metal housing has been formed around the pipe 10 with provisions for supporting a tapping machine, all in a system that does not require welding directly to the pipe which would expose the pipe to temperatures that could be harmful such as if explosive mixtures are flowing through the pipe. If, after the fitting has been secured to the pipe, conditions change so that pipe 10 can be welded to without danger then thereafter welding beads can be formed (not shown) securing the collars and specifically semi-toroidal upper collar portions 16A and 18A and lower collar portions 16B and 18B to the external surface of pipe 10. When this is accomplished, the sealing of the interior of the fitting is then no longer dependent upon the integrity of gaskets 14A-14D.

In the assembly of the portions making up the weldable mechanical fitting as herein described spacers may be employed. For example, in FIG. 4, upper spacers 88A and 88B may be secured to the interior semi-cylindrical surface 70 of upper containment member 60 to help stabilize the containment member 60 on the upper exterior surface of the pipe 10. In a similar manner, an elongated lower spacer 90 may be employed as illustrated on the internal semi-cylindrical surface 58 of lower containment member 48. The thickness of the spacers 88 and 90 must not exceed the thickness of the collars.

Further, to ensure proper alignment of the upper and lower semi-toroidal collar portions, alignment pens 92, (see FIG. 4) may be installed to extend from end surfaces 38 of the lower semi-toroidal collar portions 16B and 18B. These alignment pens are received in openings (and not seen) in the corresponding end surfaces 38 of upper collar portions 16A and 18A. These alignment pens 92 serve to ensure that bolt holes 34 are in alignment with threaded holes 36 so that the bolts 40 are easily installed when the collar semi-toroidal portions are fitted to each other in the assembly process.

FIGS. 1 and 4 show zerts 94 that are inserted in ports 96 (one of which is seen in FIG. 4) by which a liquid sealant can be injected into the area 98 between sealing grooves 30 of the lower semi-toroidal collar portions 16B and 18B. The sealant flow, under pressure through passageways 100 and internal ports 102 to emerge between gaskets 14A and 14B and 14C and 14D. The liquid sealant, after filling the space between gaskets 14 and the exterior surface of pipe 10 passes through outlet ports 104 in upper semi-toroidal collar portions 16A and 18A (seen only in collar portion 16A of FIG. 4). Plugs 106 are used to close outlet parts 104 after the sealant has been fully injected. The sealant, which may be of the type that solidifies with time, provides a secondary system for sealing the exterior surface of pipe 10.

It is understood that the embodiment set forth herein is for purposes of exemplification of the invention and the invention is not limited to the specific embodiment illustrated but is to be limited only by the scope of the attached claim or claims, including the full range of equivalency to which each element thereof is entitled.

What is claimed is:

1. A system for use in tapping a pipe carrying fluid under pressure, comprising:

first and second metal collars, each formed of attachable upper and lower semi-toroidal portions that, when assembled on the pipe and attached to each other, provide internal cylindrical surfaces conforming to the pipe external cylindrical surface, each collar having at least one internal circumferential sealing groove therein, the collars when assembled on the pipe providing spaced-apart external cylindrical surfaces;

gaskets formed about the pipe external cylindrical surface and received in each said internal circumferential sealing groove in said collars;

a lower semi-tubular metal containment member of internal cylindrical diameter conforming to said external cylindrical surfaces of said collars and providing paralleled horizontal edges; and an upper semi-tubular metal containment member of internal cylindrical diameter conforming to said external cylindrical surfaces of said collars and providing paralleled horizontal edges that match said horizontal edges of said lower containment member when the containment members are assembled on said collars, the upper containment member having an integral upwardly extending tubular access portion providing a passageway for tapping the pipe, the upper and lower containment members being weldable to each other and to said collars to fully encompass a portion of the pipe while providing access for tapping the pipe and without welding to the pipe, said collars having a thickness such that no portion of the pipe rises to ignition temperature as a result of welding.

2. A system according to claim 1, including:

a flange in a horizontal plane affixed at an upper end of said tubular access portion extending from said upper containment member to which apparatus may be fixed for tapping the pipe.

3. A system according to claim 1, including:

spacers affixed to the internal surfaces of said upper and lower containment members of thickness substantially equal the thickness of said collars.

4. A system according to claim 1 wherein said gaskets are formed of elastomer cords.

* * * * *